Patented June 9, 1953

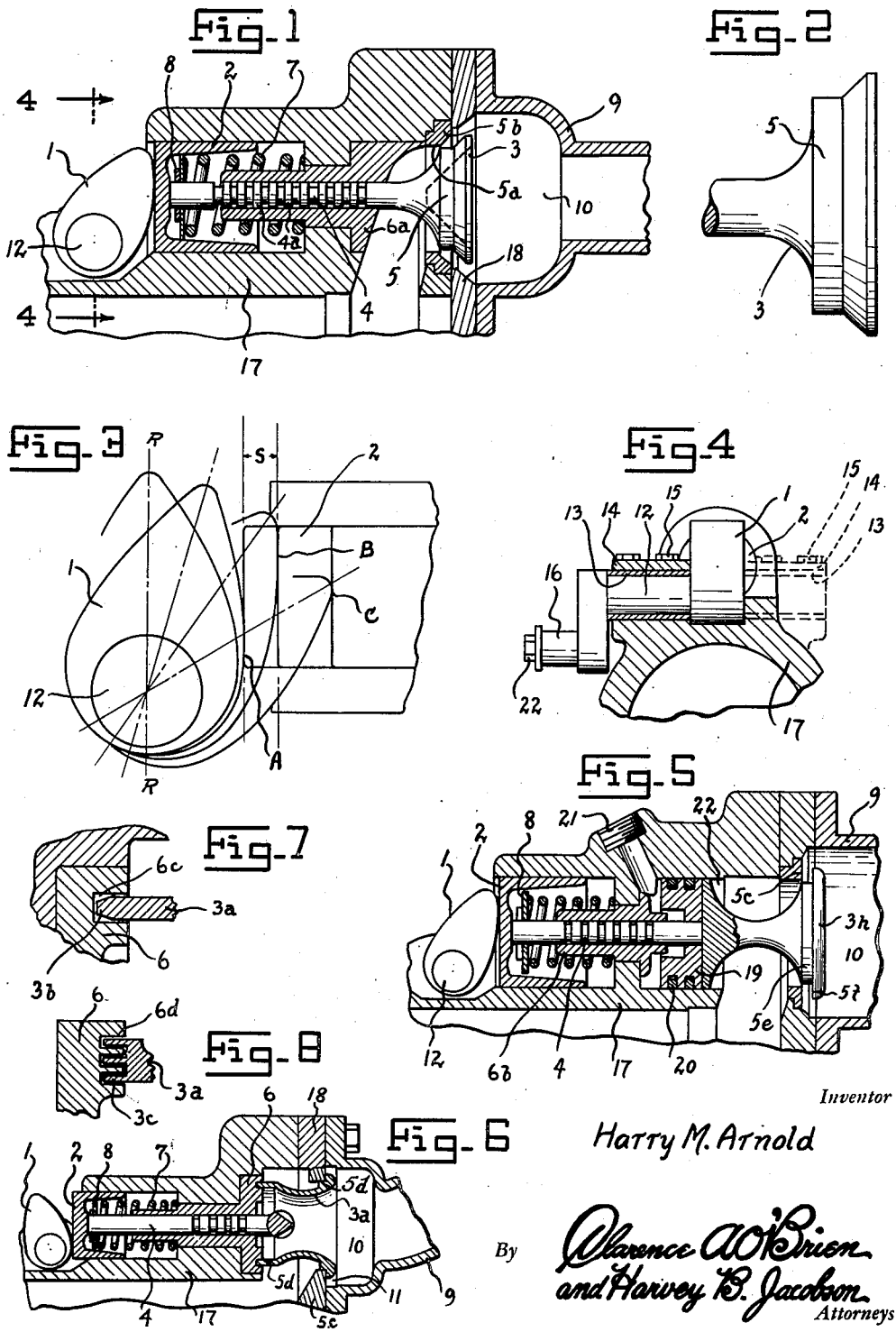

2,641,438

UNITED STATES PATENT OFFICE 2,641,438

DELAYED OPENING POPPET VALVE FOR STEAM ENGINES

Harry M. Arnold, Golden, Colo.

Original application August 17, 1945, Serial No. 611,117. Divided and this application April 10, 1946, Serial No. 660,979

1 Claim. (Cl. 251—132)

This invention relates to a special form of poppet-valve mechanism intended primarily for use in steam engines utilizing very highly superheated steam or other hot gases working as steam. This application is a divisional application containing subject matter illustrated but not claimed in my Patent No. 2,464,112, granted March 8, 1949, on Cylinder Head for Superheated Steam Engine.

The general object of the invention is to provide a simple and very strongly built poppet valve mechanism and oscillating cam similar to the valve mechanism of internal combustion engines but having special properties making it very effective for fluid admission valves in superheated steam engines.

The present practice in poppet-valves now used in steam engines is to pop the valve open very quickly and let it seat quickly. If the engine operates at high piston speed, as is the case with modern engines, the valve is lifted and seated so quickly the inertia of the valve and related parts is a very detrimental factor. Poppet-valve mechanisms of this type are very noisy at high speed because of the hammer-like blows set up in the mechanism by the very sudden opening and closing of the valve.

I provide a cam and poppet-valve assembly so constructed that the cam lifts the valve very gradually and allows it to seat again in a very gradual manner. In order to obtain efficiency in a steam engine the valve must open and close the valve port very quickly to avoid undue resistance to the flow of steam entering the cylinder. The labyrinth seal in common use in steam turbines has proven of great value where two surfaces are not allowed to touch while in motion. I apply the labyrinth seal to rings or skirts provided under the valve heads so the steam will not be admitted into the cylinder until the cam has accelerated the valve to its position of maximum velocity. When the valve closes, it interrupts the flow of steam entering the cylinder at its point of maximum velocity.

A small amount of steam will leak past the labyrinth seal so provided. It has been found in steam turbines that the steam thus lost is very small as compared with the great volume of steam used to drive the turbine. Likewise, the steam escaping into the cylinder of the engine during the very small interval of time the seal is in use will be negligible.

Referring to the accompanying drawings wherein like numbers denote like parts throughout; the features of the invention are explained in detail.

Figure 1 is a fragmentary longitudinal sectional view of a cylinder having a high lift unbalanced single beat poppet-valve commonly used in internal combustion engines but provided with the cam and labyrinth seal.

Figure 2 is a side elevational view of a valve head showing the addition of the skirted part which is the most simple labyrinth seal.

Figure 3 is a diagrammatic view of the cam and follower and shows the way the cam imparts the desired motion to the follower.

Figure 4 is a fragmentary cross-sectional view of the cam, cam shaft, bearing and cylinder taken on the line 4—4 of Figure 1.

Figure 5 is a fragmentary longitudinal sectional view of a cylinder provided with a high lift single beat balanced poppet-valve with a flat seat having the cam and labyrinth seal applied to it.

Figure 6 is a fragmentary longitudinal sectional view of a cylinder showing the application of the cam and labyrinth seal to a double ported tubular valve.

Figure 7 is a greatly enlarged fragmentary view of the double ported tubular valve showing the application of the labyrinth seal to the inner valve seat, and Figure 8 is a modification thereof.

In these drawings the member 1 is a specially made oscillating cam so constructed and located that it can be used to actuate one valve as in a single acting engine or two valves as in a double acting engine. The double acting engine is illustrated in detail in my Patent No. 2,464,112.

Referring to Figure 3 it will be seen that the cam 1 first contacts the follower 2 at the point A which is nearly in line with the center of the cam shaft 12 and at the beginning of decline toward the center line R of said cam. At this point the velocity of contact is very slow and the lifting power of the cam is very great so that the valve head 3, of Figure 2, is started from rest with very little impact and with very little strain on the accompanying valve mechanism. The face of the cam 1 may be a curve, or a combination of curves of varying radii. This makes possible the most desirable acceleration of the valve head 3 from its point of rest at A to its point of maximum velocity at the point B. During the movement of the cam 1 from A to B the valve head 3 will be lifted a distance S from its seat. It is during this slow movement of the valve head 3 that admission of steam to the cylinder is not desired. A cylindrical skirt 5 equal in width to the distance S is applied to the valve head 3 and this skirt fits inside the valve port 5a with a very small clearance so no rubbing contact is involved. The small clearance thus provided is the most simple form of the labyrinth seal and when the clearance is small the steam leaking through becomes a very small quantity. The port 5a is formed in a valve seat member 5b.

At the point B the valve head 3 is traveling at its greatest velocity and the edge of the skirt 5 passes the edge of the valve port 5a, giving a quick opening of the port. From B to C the cam comes to rest and the valve head 3 is then in its full open position. Next the cam 1 returns to position B and the valve spring and steam pressure cause the valve head 3 to follow the follower 2 and cam 1 so they are traveling at their maximum velocity again when the skirt 5 on the valve head 3 enters the port 5a and interrupts the flow of steam into the cylinder. From B to A the cam 1 checks the velocity of the valve head 3 so that valve head 3 engages the seat 5b when traveling very slowly.

In Figure 4 the simple and sturdy construction of the cam 1, follower 2 and cam shaft 12 can be seen. Bearing inserts 13 are held in position by the cap 14 which in turn is held in position on the cylinder 17 by the bolts 15. In very large engines the cam shaft 12 can be made to extend through the cam 1 so another bearing 13, 14 and 15, shown in dotted lines, can be used to give additional strength and bearing surface. The drive arm and pin 16 for the shaft 12 may be made as part of the shaft 12. A bolt and washer 22 hold the driving rod on the pin 16.

Figure 6 shows the application of the cam 1 and labyrinth seal to a double beat tubular valve 3a. The valve 3a engages the seat member 5c at its outer end while the inner end extends into the valve seat member 6 a distance which is approximately equal to the travel of the cam 1 from its point of contact with the follower 2 at A to the point B, see Figure 3. A skirt 5d is also provided at the outer end of the valve 3a. The follower 2 has a working fit in a chamber made in a part of the cylinder block 17. The valve spring 7 holds the valve 3a in closed position and is secured to the valve stem 4 by the stem key 8. The hot steam, or other gases working as steam, enter the valve chest 10 through the pipe 9. A special metal seal 11 may be used at the junction of the valve chest 10 and the cylinder head 18.

Figure 7 shows the details of the labyrinth seal applied to the inner end of the valve 3a by providing a channel 6c in the valve seat member 6 into which the tapered inner edge 3b of the valve extends. In larger valves the seal may be made more effective by using several concentric channels 6d in the valve seat for receiving circular ribs 3c on the valve, as shown in Figure 8. Figure 8 is the true labyrinth seal as used in steam turbines.

In double ported valves the common practice is to use a flexible seat at either the outer end of the valve or at the inner end. When very high temperatures are employed, the wear of such a valve seat assembly becomes too great for practical use. When the labyrinth seal is used the valve 3a does not contact the seat 6. When the valve 3a and seat 6 are cold the clearance at the bottom of the grooves will be considerable, up to ¼" or more in large valves. After the valve 3a and seat 6 heat up to their normal running temperature valve 3a will extend deeper into the seat 6 so that a very small clearance will exist. If the valve 3a and seat 6 are made of the same kind of material the expansion radially will be approximately the same so the flanges of the seal will not bind on the valve flanges.

Figure 1 shows the cam 1 and skirt 5 applied to a single beat high lift unbalanced poppet-valve 3 the same as that of Figure 2. The valve seat 5b is a tapered seat to engage the beveled edge of the valve 3. A valve stem guide 6a is provided for the valve stem 4 to slide in. The valve stems 4 have annular grooves 4a for collecting oil or moisture for a seal. The valve seat 5b is pressed into a flange made as a part of the cylinder 17.

When very high temperatures are to be used, the circulating system explained and illustrated in my Patent No. 2,464,112 will keep the valve guides 6, 6a and 6b and the valve stems 4 at a low temperature so oil or moisture will remain in the grooves around the stems 4. Portions of the valve mechanism may be insulated to avoid heat losses as will be seen in my Patent No. 2,194,000 granted March 19, 1940, on Superheated Steam Engine.

Figure 5 shows the cam 1 and skirt 5e applied to a high lift single beat poppet-valve of the balanced type. The valve 3h engages the seat 5c and has a flat flange 5f projecting from the valve at right angles to the cut-off skirt 5e for engaging the valve seat 5c.

A small piston 19 is fitted wtih rings 20 that have a working fit in a small cylinder 22 in the main cylinder block 17. The valve guide 6b is short. A passageway 21 is provided for steam or other gases under pressure to enter behind the piston 19 so that a large part of the pressure on the valve 3b will be balanced off. The cam 1 and related mechanism can be made smaller and ligher because less work is required to open the valve.

In this valve assembly the cooling system illustrated in my Patent No. 2,464,112 is very important as a means of preventing overheating of the piston 19, rings 20, valve guide 6b and valve stem 4.

In Figure 3 it will be seen that cam 1 swings through an arc on each side of the vertical center line R without disengaging the valve 3. When the well-known reversing link and combination motions are used and the link is in mid-position, a small amount of motion is imparted to the cam 1 but not enough to disengage the valve 3. As the link is moved toward either extremity the cam 1 reaches its full swing at C. This makes possible any desired opening of the valve from nothing to full open in either direction of rotation of the engine.

In stationary engines designed to run continuously in one direction of rotation, the well-known fly-wheel governor and single variable eccentric will give the same results. When the eccentricity is decreased by the governor the valves will open less or not at all.

It is to be understood that changes may be made in the combination and arrangement of the several parts provided that such changes fall within the scope of the appended claim.

Having described my invention, what is claimed as new is:

Poppet valve mechanism for an engine including a cylinder block having a cylinder therein, said valve mechanism being supported by the block and comprising a valve stem mounted for axial reciprocation within an elongated valve stem guide member, said stem being provided with a series of axially spaced oil collecting grooves, said guide member being supported in said block and having one end thereof projecting centrally within a cylindrical open ended recess in the block, a coil spring disposed within said recess in encircling relation to said stem and said one end of the guide member and having its opposite ends reacting upon the end wall of said recess and an abutment on said stem for yieldably urging the stem toward the open end of said recsss, a cylindrical cup-shaped follower member disposed within said recess and including an end wall engaging the corresponding end of said stem and exposed through the open end of said recess and a cylindrical wall within which the adjacent ends of said valve stem and said spring are disposed, a follower actuating cam supported on a shaft whose axis is disposed laterally of the axis of said stem and at right angles thereto and which shaft is oscillatably supported by said block, said cam having a convex surface engageable with said follower end wall and operative to axially move said stem against the action of said spring, a valve head seat member supported by said block in concentric relation to said stem, said valve seat member being provided with a circular valve head seating face on the outer lateral side thereof and a fluid admission port in said seat member having a cylindrical wall extending directly inwardly from said seating face and said valve stem extendable through said port, a valve head on the opposite end of said stem having a seating face for cooperating with the seating face on said seat member, a skirt projecting directly inwardly from said seating face and having an outer cylindrical surface adapted to be disposed within and in substantial engagement with said cylindrical wall in the seated position of said valve head, and said skirt being of a length less than the range of movement of said head between its seated position and its maximum open position.

HARRY M. ARNOLD.

References Cited in the file of this patent

UNITED STATES PATENTS

| Number | Name | Date |
|--------|------|------|
| 201,352 | Little | Mar. 19, 1878 |
| 638,564 | Davies | Dec. 5, 1899 |
| 847,086 | Lentz | Mar. 12, 1907 |
| 1,322,035 | Madigan | Nov. 18, 1919 |
| 1,500,342 | Smith | July 8, 1924 |
| 1,509,862 | Edick | Sept. 30, 1924 |
| 1,695,726 | Woolson | Dec. 18, 1928 |
| 2,395,633 | Livers | Feb. 26, 1946 |